Nov. 11, 1952     C. O. MARSHALL, JR., ET AL     2,617,641
RATIO-INDICATING WEIGHING SCALE
Filed March 18, 1946                          8 Sheets-Sheet 1
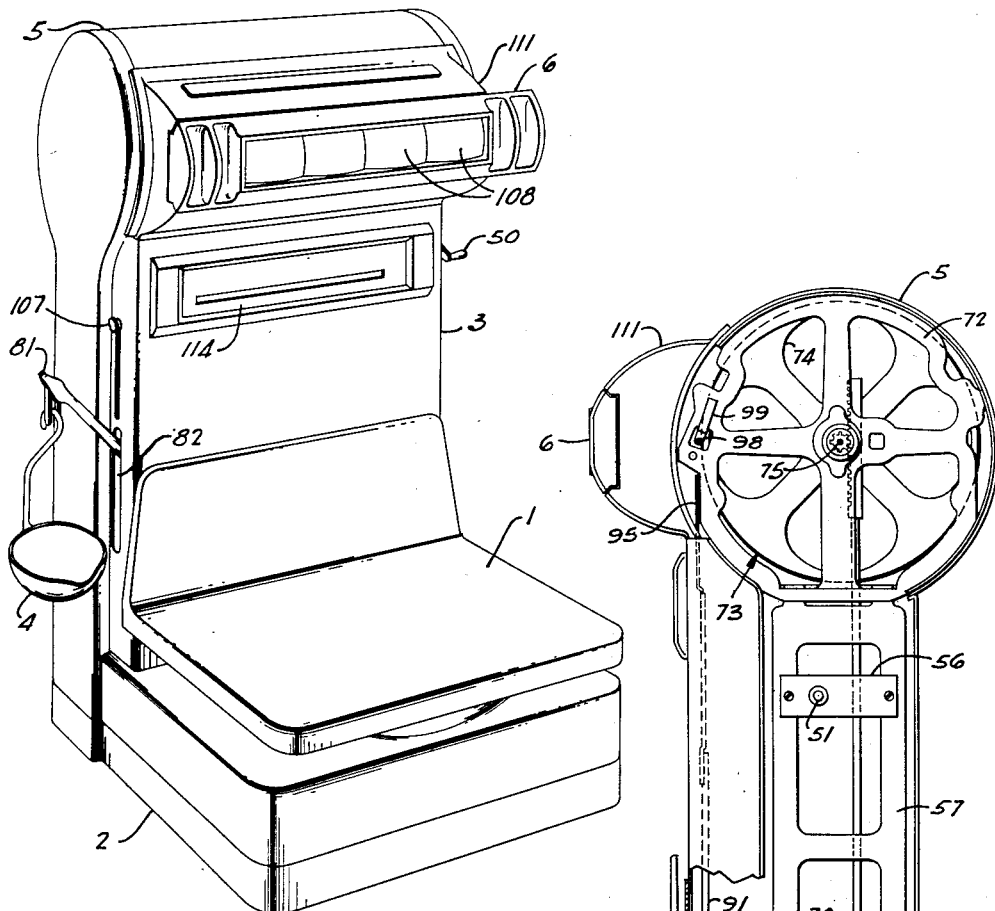
Fig. I
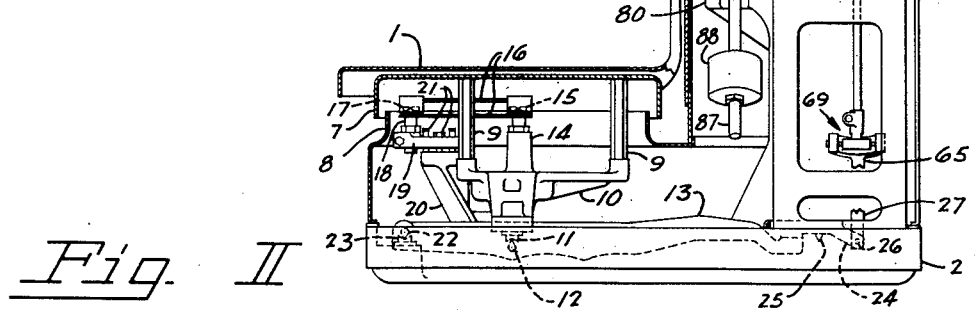
Fig. II
INVENTORS
Charles O. Marshall Jr.
Maynard C. Yeasting
BY
Marshall and Marshall
ATTORNEYS Nov. 11, 1952     C. O. MARSHALL, JR., ET AL     2,617,641
RATIO-INDICATING WEIGHING SCALE
Filed March 18, 1946     8 Sheets-Sheet 2
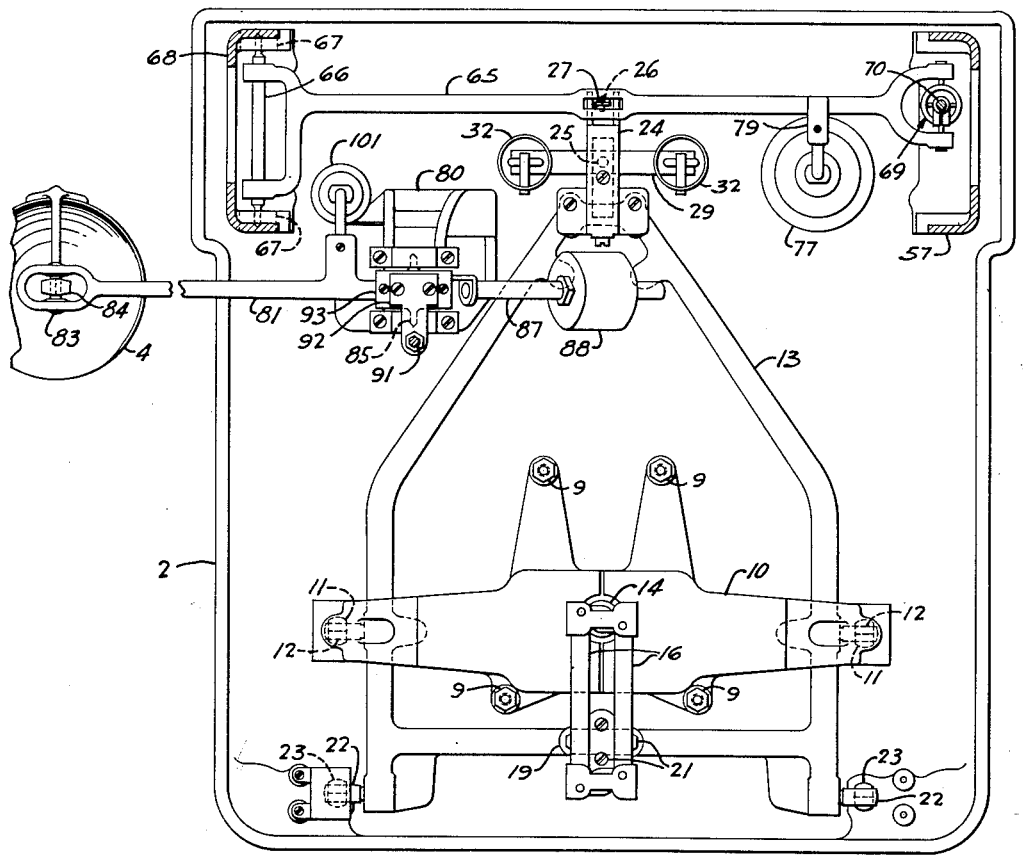
_Fig. III_
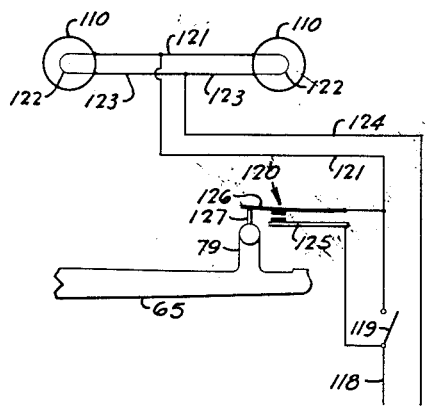
_Fig. IV_
INVENTORS
Charles O. Marshall Jr.
Maynard C. Yeasting
BY
Marshall and Marshall
ATTORNEYS

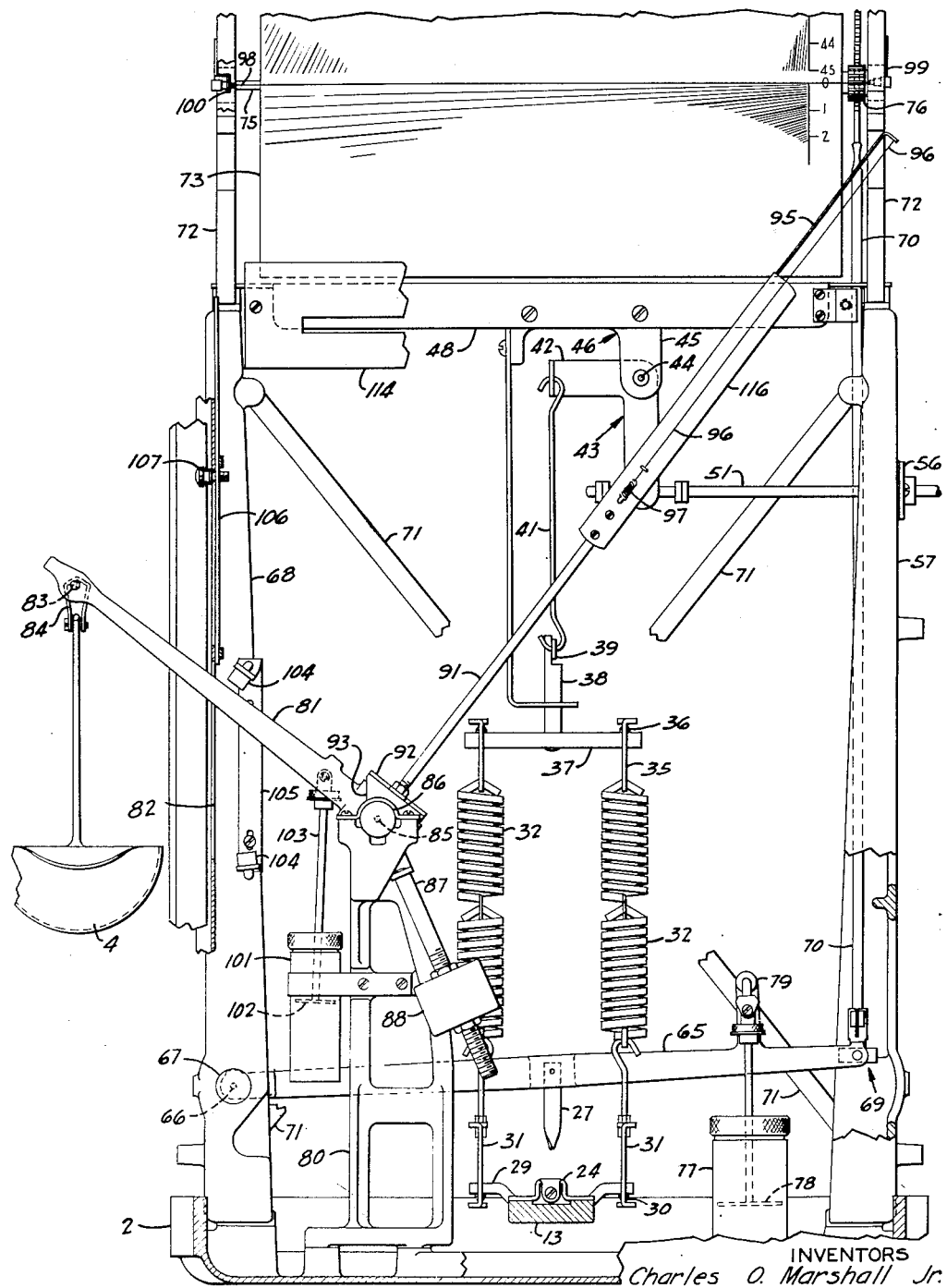
Fig. V

Nov. 11, 1952 — C. O. MARSHALL, JR., ET AL — 2,617,641
RATIO-INDICATING WEIGHING SCALE
Filed March 18, 1946 — 8 Sheets-Sheet 4
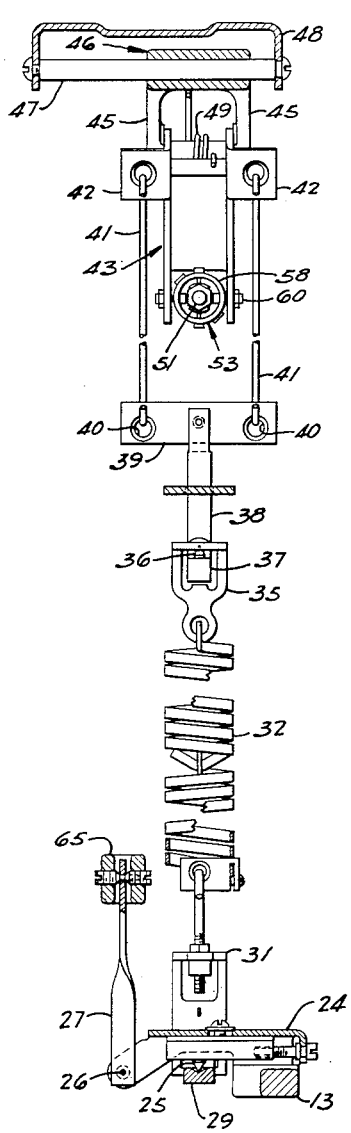
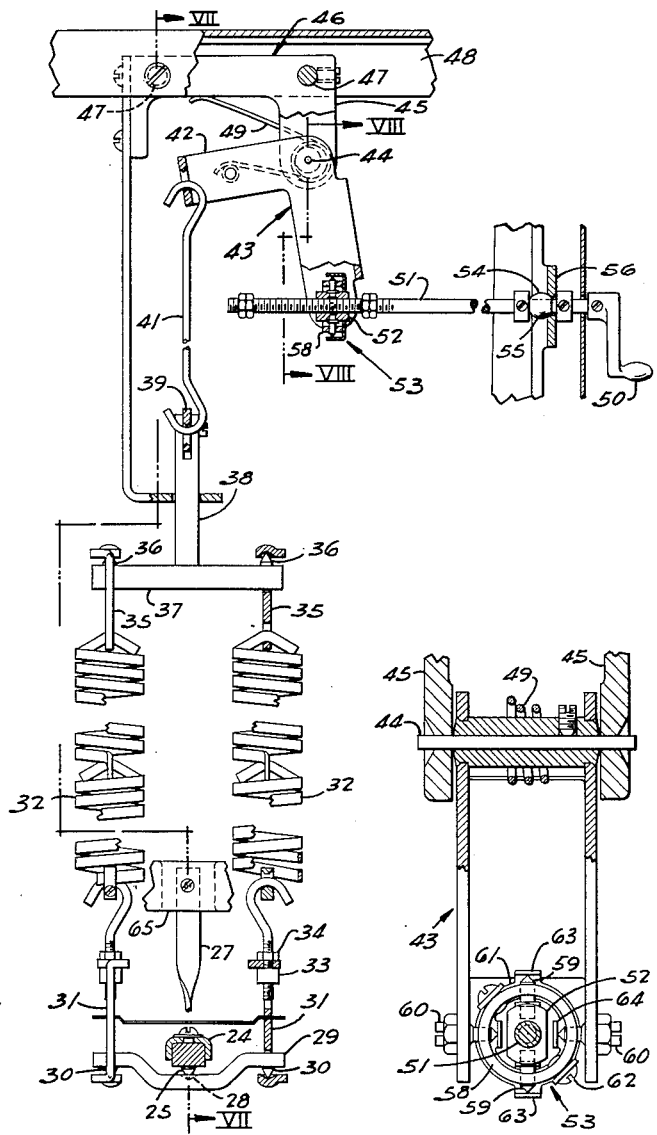
Fig. VII    Fig. VI    Fig. VIII
INVENTORS
Charles O. Marshall Jr.
Maynard C. Veasting
BY
Marshall and Marshall
ATTORNEYS Nov. 11, 1952     C. O. MARSHALL, JR., ET AL     2,617,641
RATIO-INDICATING WEIGHING SCALE
Filed March 18, 1946     8 Sheets-Sheet 5
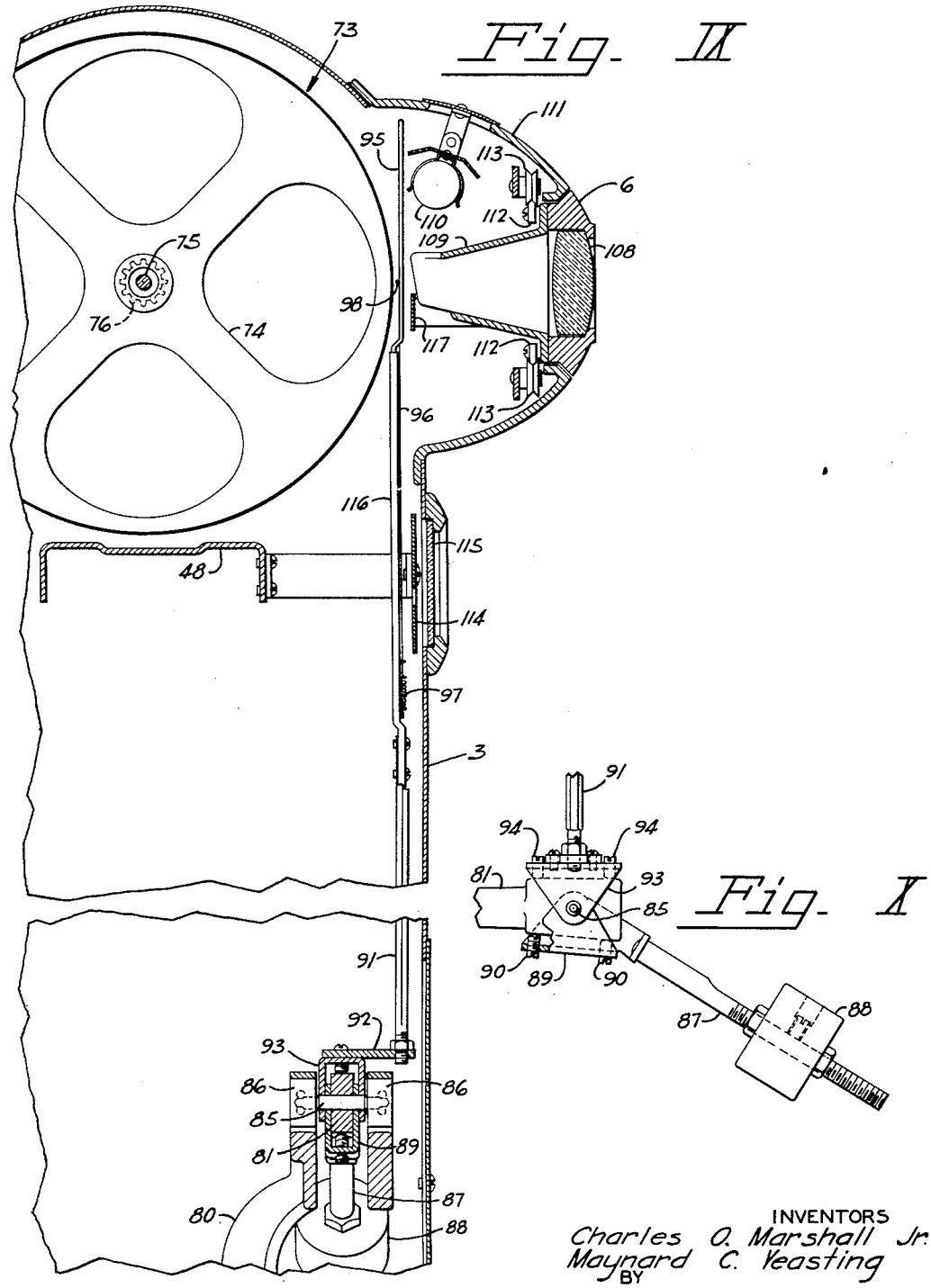
INVENTORS
Charles O. Marshall Jr.
Maynard C. Veasting
BY
Marshall and Marshall
ATTORNEYS

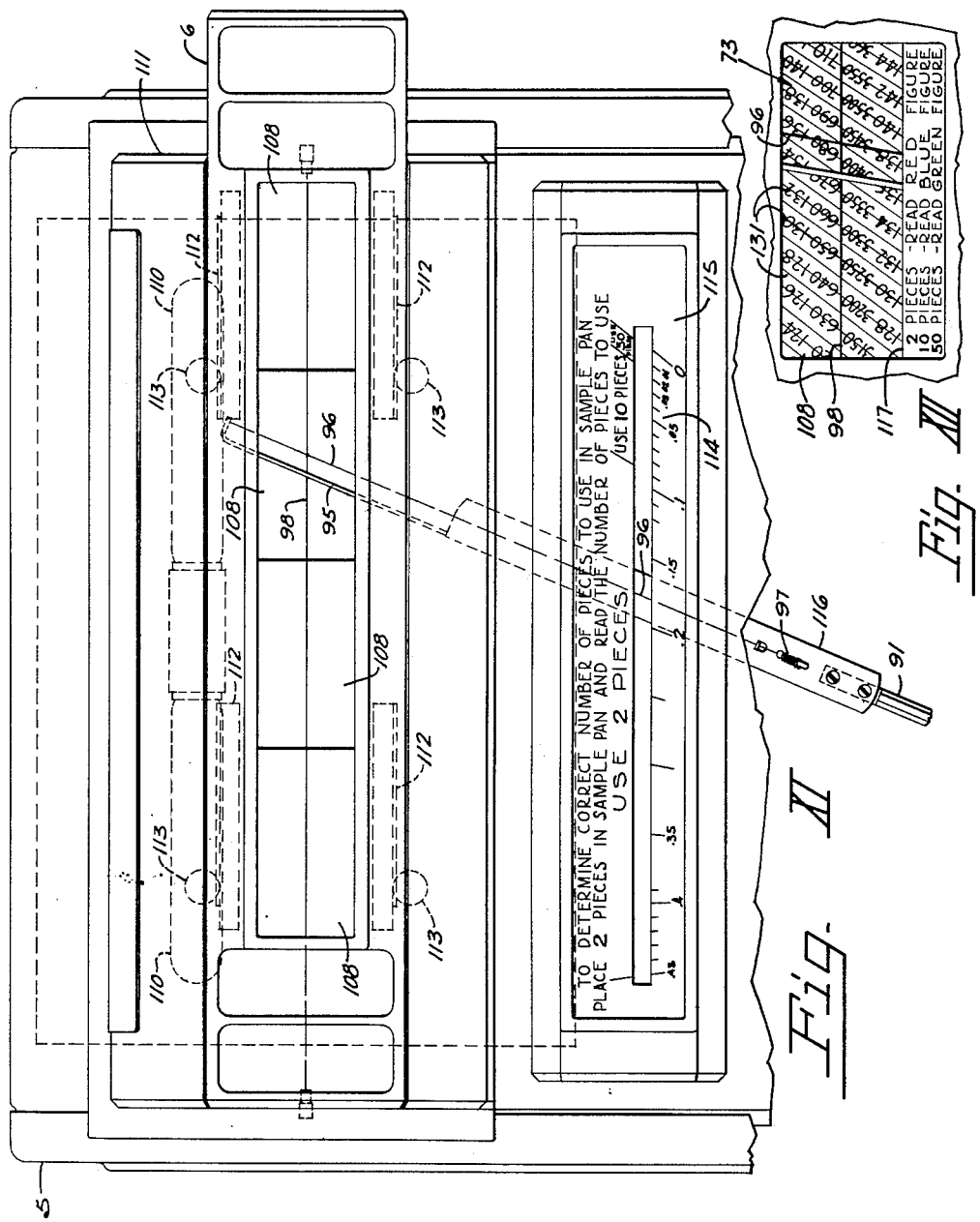

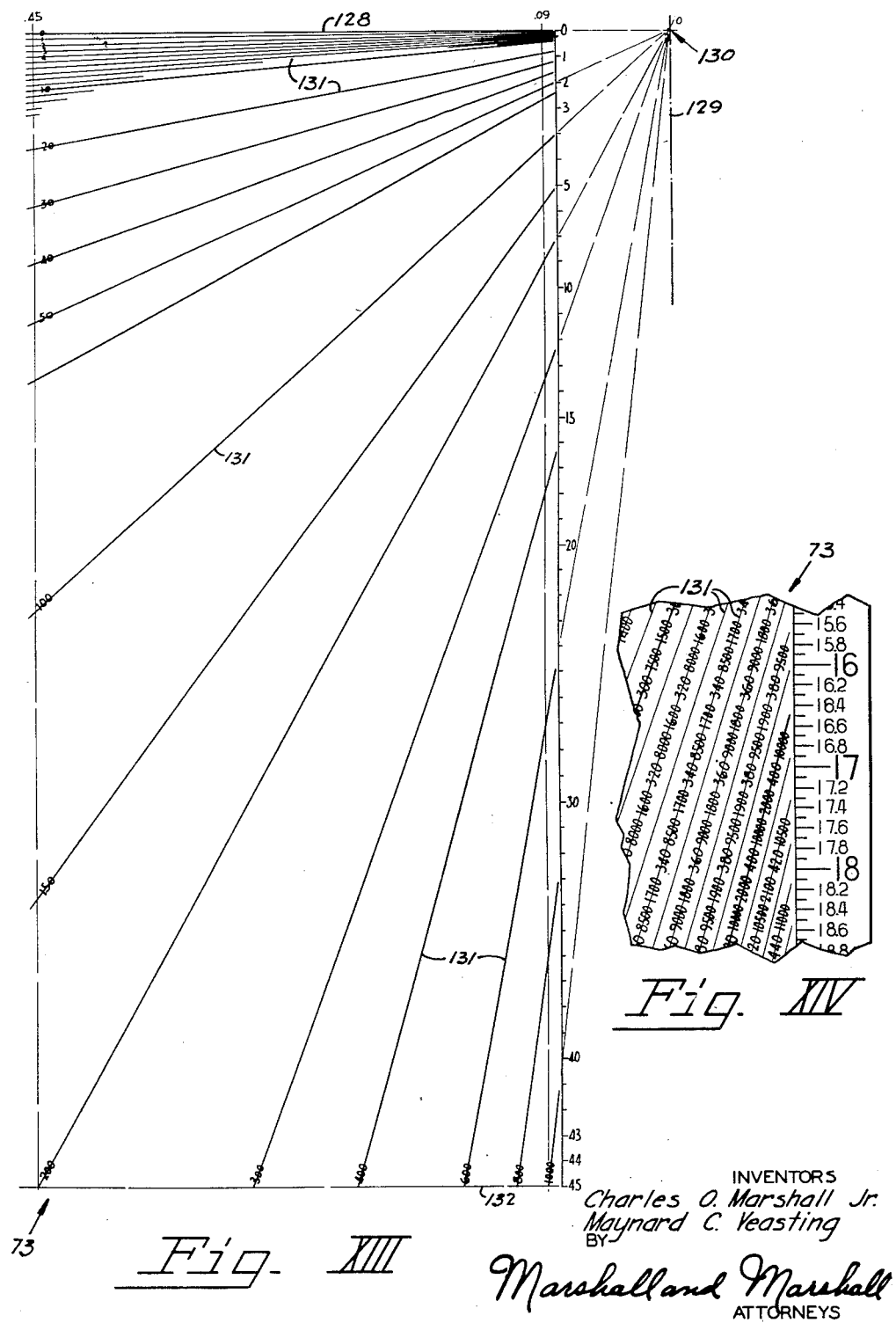

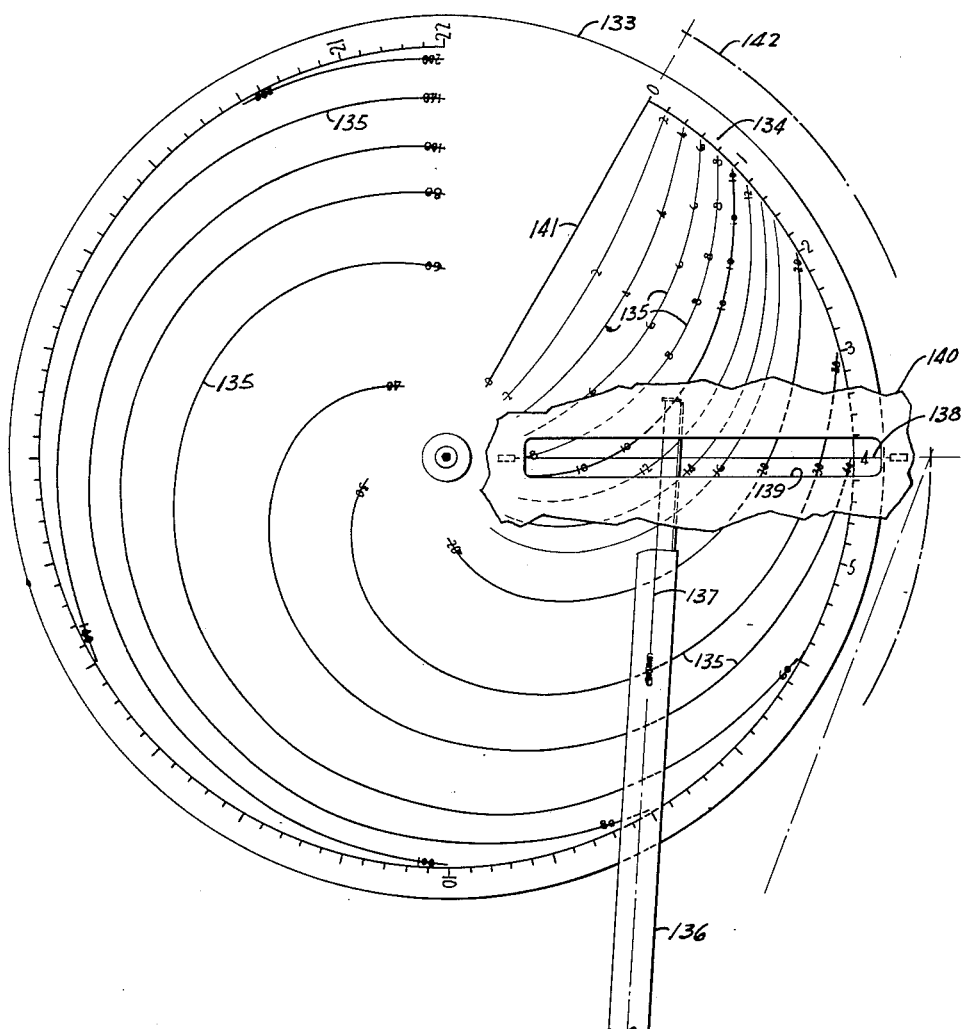
Fig. IV

Patented Nov. 11, 1952

2,617,641

UNITED STATES PATENT OFFICE 2,617,641

RATIO-INDICATING WEIGHING SCALE

Charles O. Marshall, Jr., and Maynard C. Yeasting, Toledo, Ohio, assignors to Toledo Scale Company, Toledo, Ohio, a corporation of New Jersey Application March 18, 1946, Serial No. 655,296

9 Claims. (Cl. 265—39)

This invention relates to weighing scales and in particular to a weighing scale for indicating the ratio of the weights of two independent loads. The ratio of the two loads may represent a count of a number of parts in one load when the other load contains one or more similar parts.

Automatic counting scales have been proposed from time to time but none has been entirely satisfactory. Those that were made direct reading, i. e. such that the count was indicated with no manipulation of the scale other than placing a representative sample on one load receiver and the parts to be counted on another load receiver, were unusually complicated and difficult to manufacture and service. These devices also suffered from the fact that all of the graduations were crowded into a very small reading space so that it was difficult to secure an accurate reading even if the scale mechanism were perfectly accurate.

The principal object of this invention is to provide a direct reading counting scale which is simple to manufacture and adjust.

Another object of the invention is to provide a counting scale having a large chart area and widely spaced indicia so that precise readings may easily be obtained.

Another object is to provide a counting scale in which a movable chart, a movable indicator, and a fixed reading line cooperate to give a direct indication of the ratio of the two loads applied to the scale.

A still further object is to provide a counting scale with means for indicating the actual weight of each of the loads in addition to indicating the ratio of their weights.

These and other objects and advantages are apparent from the following description of an embodiment of the invention illustrated in the accompanying drawings.

An improved counting scale constructed according to the invention has a movable chart that is rotatable through equal angles in accordance with equal increments of load applied to a first load receiver. The rotatable chart is in the general form of a surface of revolution (disk, cone, or cylinder) whose generating element or generatrix is a straight line. An indicator actuated by a second weighing mechanism moves along a geometrical element (any position of the generatrix) of the rotatable chart through equal distances in accordance with equal increments of a load applied to the second weighing mechanism. Indicia are arranged on the movable chart to indicate the ratio of the loads applied to the weighing mechanisms. Each series of indicia representing a given ratio is disposed along a line traced by a point whose distance, measured in radians, from that geometrical element constituting the zero indicium of the rotatable chart is a multiple of the distance along the geometrical element from a reference circle of revolution.

In the special case when the rotatable chart is in the form of a cylinder and the indicia are printed on the chart material before the material is rolled into a cylinder, the lines of indicia each representing a particular value of ratio appear as straight lines radiating from one corner of the chart. Because the indicia are crowded so as to be unreadable in the corner of the chart this portion of the chart is not graduated, thereby requiring the operator to add additional load to the sample weighing mechanism until the indicator reaches a portion of the chart where the indicia are more widely spaced.

The use of a movable chart and a movable indicator which cooperate along a fixed reading line permits the use of a simple lens system to give a magnified image of the indication.

The improved chart and the optical magnification allow the construction of a counting scale whose effective chart area is many times greater than that of any counting scale heretofore known.

Examples of the improved counting scale are shown in the accompanying drawings.

In the drawings:

Figure I is a perspective view of an improved counting scale constructed according to the invention.

Figure II is a vertical section taken perpendicular to the axis of the chart and in a plane between the right end of the frame and the housing.

Figure III is a plan view of the lower portion of the weighing scale shown in Figure I as it appears with the main load receiver and the housing removed.

Figure IV is a schematic diagram of the electrical circuit used to energize light bulbs for illuminating the chart of the weighing scale.

Figure V is a vertical section of the improved weighing scale showing the load counterbalancing mechanisms and the general arrangement of the rotatable chart and the movable indicator.

Figure VI is a fragmentary vertical elevation of the load counterbalancing mechanism and initial load offsetting mechanism.

Figure VII is a vertical section of the load counterbalancing mechanism as seen from the line VII—VII of Figure VI.

Figure VIII is a detailed view of the initial load offsetting mechanism as seen from the line VIII—VIII of Figure VI.

Figure IX is an enlarged vertical section of the indicating means used in the improved counting scale.

Figure X is a fragmentary detail showing the indicator and counterbalance connection of the sample load weighing mechanism.

Figure XI is a fragmentary elevation of the upper portion of the improved counting scale.

Figure XII is a portion of the indicating chart and indicator as seen through one of the magnifying lenses.

Figure XIII is a developed view of the rotatable chart of the improved counting scale.

Figure XIV is a greatly enlarged fragmentary section of the chart shown in Figure XIII.

Figure XV shows a modified form of rotatable chart constructed according to the invention.

These specific figures and the accompanying descriptions are intended merely to illustrate the invention but not to impose limitations upon the claims.

The improved counting scale has a main load receiver 1 supported above a horizontal base 2. A generally rectangular cross section column 3 erected from the rear portion of the base 2 houses load counterbalancing mechanisms for the load receiver 1 and a second load receiver 4. The rectangular column 3 is surmounted by a horizontal cylindrical housing 5 whose forward portion extends forward above the main load receiver 1 to support a lens frame 6. The general external appearance of the improved counting scale is similar to the computing scales commonly employed in retail meat markets except that the rectangular column 3 is thicker and taller than the corresponding column of a meat market scale.

The main load receiver 1 has a depending circular apron 7 (Figure II) which telescopes over an upstanding rim 8 of the base 2. The apron 7 and the rim 8 prevent the ingress of foreign material to the weighing mechanism contained within the base 2. The load receiver 1 is supported by means of struts 9 on a spider 10 whose lower extremities are provided with V-bearings 11 resting on load pivots 12 of a main lever 13. A short vertical portion 14 of the spider 10 carries a pair of horizontal oppositely directed knife edges 15 which engage cooperating V-bearings in a check link 16. The other end of the check link 16 engages another pair of horizontal oppositely directed knife edges 17 attached to the top of a post 18 which is clamped in a bracket 19 adjustably secured to the top of an arm 20 erected from the base 2. The bracket 19 is secured to the top of the arm 20 by four screws 21 two of which are threaded into the top of the arm 20, while the other two are threaded through the bracket 19. This arrangement of the screws 21 permits the position of the knife edges 17 to be accurately adjusted both for height and horizontal position.

The main lever 13 has fulcrum pivots 22 (Figure III) which rest on V-bearings 23 located in the forward corners of the base 2. The main lever 13 is generally A-shaped in plan and its apex is provided with a nose iron 24 that has a power pivot 25 and a pin connection 26 for a short vertical link 27. The power pivot 25 is conical in form and rests in a conical recess 28 formed in an evener 29 (see Figures V and VI). The evener 29 has a pair of conical pivot points 30 adjacent its ends and equally spaced from the conical recess 28. The pivot points 30 are engaged in recesses formed in the bottom ends of suspension links 31 whose upper ends are hooked into the bottom ends on a pair of load counterbalancing springs 32. Each of the suspension links 31 is formed of two parts one of which is inserted through a hole in the other and held in place by nuts 33 and 34. The nuts 33 and 34 allow the length of the suspension links 31 to be adjusted so that the evener 29 is held in a substantially horizontal position.

The counterbalancing springs 32 are suspended from stirrups 35 whose upper ends rest on pivot points 36 set in the ends in a cross bar 37 of a T-shaped hanger 38. The stem of the hanger 38 is round and is bifurcated at its upper end to receive a pivoted spreader 39. The spreader 39 having eyes 40 near its ends to receive a pair of hooks 41 is suspended from generally horizontal arms 42 of a bellcrank lever 43. The bellcrank lever 43 is pivotally mounted on a horizontal axle 44 (Figure VIII). The axle 44 spans the space between a pair of depending ears 45 of a generally L-shaped hanger block 46. The hanger block 46 is carried on a pair of parallel rods 47 crossing the width of a channel shaped member 48 which forms the upper portion of the frame of the weighing scale. The bellcrank lever 43 is urged in a counterclockwise direction as seen in Figure VI by a spring 49. Its position may be adjusted by turning a crank 50 which screws a threaded rod 51 through a nut 52 connected by a gimbal ring assembly 53 to the lower end of the bellcrank lever 43. The forces of the load counterbalancing springs 32 and the spring 49 both tend to force the threaded rod to the right as seen in Figure VI. Translation of the rod is prevented by a spherical thrust bearing comprising a ball 54 and a conical seat 55 machined in a cross piece 56 attached to a standard 57 which forms one side of the frame of the scale. A collar locked on the rod 51 positions the ball 54 and permits the initial position of the rod 51 to be adjusted so that the hub of the crank 50 just clears the housing of the scale.

The gimbal ring assembly 53 includes a ring 58 having four radial holes equally spaced about its periphery. A pair of pins 59 fitted in the nut 52 and extending radially outward therefrom in opposite directions engage two of the radial holes of the ring 58. A second pair of cone-tipped pins 60 threaded through the depending arms of the bellcrank lever 43 engage the other two holes of the ring 58. A formed member 61 attached to the ring 58 by means of screws 62 has one pair of ears 63 serving as thrust plates to position the ring 58 with respect to the nut 52 and another pair of ears 64 serving as thrust plates for the cone-tipped pins 60 to position the ring 58 with respect to the bellcrank lever 43. This gimbal ring assembly provides free universal movement between the bellcrank lever 43 and the threaded rod 51 so that no friction or binding may occur to interfere with the smooth adjustment of the bellcrank lever 43.

Referring to Figures V and VII, the link 27, pivotally connected to the nose iron 24, extends upwardly and is pivotally connected to a transverse lever 65. The fulcrum end of the lever 65 is forked (see Figure III) to provide spaced apart points of support for an axle 66 whose ends are carried in antifriction bearings 67 mounted in a standard 68 forming the left side of the frame of the scale. The other end of the transverse lever 65 is also forked and by means of a gimbal ring assembly 69 similar to the gimbal ring 53 is connected to an upwardly extending rack rod 70.

The standards 57 and 68 are joined at their upper ends by the channel shaped member 48 and are reinforced against lateral deflection by a pair of diagonal braces 71. Surmounting the upper ends of the standards 57 and 68 are a pair of generally circular chart housing frames 72. A cylindrical chart 73 carried on spiders 74 spaced along a shaft 75 is rotatably mounted between the chart housing frames 72 with the ends of the shaft 75 journaled in antifriction bearings locked in the centers of the frames 72. The shaft 75 adjacent one of its ends carries a pinion 76 whose teeth mesh with and are driven by teeth cut in the upper end of the rack rod 70.

Forces from loads on the load receiver 1 transmitted through the lever 13 are counterbalanced by extension of the weighing springs 32. The extension of the weighing springs permits the lever 13 to descend and to thereby pull the transverse lever 65 downwardly. The motion of the lever 65 is transmitted through the rack rod 70 and pinion 76 to rotate the rotatable chart 73 through an increment of angle in accordance with the increment of load placed on the load receiver 1. Oscillations of the chart and lever system following changes in load are quickly damped out by a hydraulic dashpot 77 whose plunger 78 is pivotally connected to an arm 79 of the transverse lever 65.

The bellcrank lever 43 whose position is controlled by the crank 50 allows the load counterbalancing springs 32 to be extended to carry an initial load or a tare load without rotating the rotatable chart 73. This feature is very convenient as it permits a container to be placed on the load receiver 1 and its weight offset so that only the net weight of the load appears on the chart 73. Without this feature the scale could not be used to count except by placing the unknown load directly on the load receiver.

A second weighing mechanism whose load receiver 4 (see Figures I and V) is suspended at one side of the generally rectangular column 3 is supported within the column 3 on a stand 80 erected from the base 2. The second weighing mechanism consists of a lever arm 81 extending through a slot 82 in the side of the housing of the scale. The end of the arm 81 has a bifurcated portion spanned by a knife edge 83. A stirrup 84 hung on the knife edge 83 carries the second load receiver 4. The fulcrum end of the lever arm 81 is fitted with a transverse shaft 85 (Figure IX) which is journaled in antifriction bearings 86 clamped in notches cut in the upper surfaces of spaced apart portions of the stand 80. A counterbalance arm 87 carrying an adjustable counterweight 88 is attached to a U-shaped hanger 89 whose sides are perforated so that it may be supported from the shaft 85. A pair of set screws 90 threaded through the bottom of the U-shaped hanger 89 and tightened against the lower surface of the lever arm 81 permit the counterbalance arm 87 to be positioned and locked with respect to the lever arm 81 as is required when adjusting the second weighing mechanism.

An indicator arm 91 is mounted in an offset bracket 92 which in turn is rigidly attached to a second U-shaped hanger 93 whose sides also fit over the shaft 85. The hanger 93 is fitted with set screws 94 which are selectively tightened against the upper surface of the lever arm 81 to adjust the angle of the indicator arm 91 with respect to the pivot line of the lever arm 81. The indicator arm 91 terminates in a long slender finger 95. A thin thread or wire 96 stretched between the end of the finger 95 and a spring 97 attached to the indicator arm 91 provides a thin straight index for the indicator 91.

A fixed reading line is provided for the rotatable chart 73 in the form of a thread 98 stretched between brackets 99 and 100 attached to the chart housing frames 72 in the same horizontal plane as the shaft 75 and at a distance from the shaft 75 such that the thread 98 lies parallel to and closely adjacent the surface of the rotatable chart 73. The finger 95 is long enough so that the threads 96 and 98 may closely pass each other to produce a virtual intersection serving as a reading point or index along the length of the thread 98 against which the indicia on the chart 73 may be read.

Continued oscillations of the second weighing mechanism following a change of load are damped out by a hydraulic dashpot 101 clamped to the stand 80 directly below the lever arm 81. The dashpot 101 is provided with a plunger 102 whose stem 103 is pivotally attached to the lever arm 81. The limits of travel of the arm 81 are fixed by a pair of rubber stops 104 set in the end of a shallow U-shaped bracket 105 which is attached to the standard 68 adjacent the slot 82.

It is sometimes desirable to be able to position the end of the indicator arm 91 with respect to the rotatable chart 73 without putting load in the load receiver 4. For this purpose a slide 106 held in position by a clamping screw 107 is lowered to obstruct a portion of the upper end of the slot 82 and thus restrict the motion of the lever arm 81. As long as the load in the load receiver 4 is less than that corresponding to the position of the lever arm 81 as determined by the slide 106 the lever arm will remain firmly in contact with the slide.

The lens frame 6 (Figures I, IX and XI) carries a set of four magnifying lenses 108 whose rectangular peripheries allow them to be mounted closely adjacent each other in a rectangular slot in the frame 6. A lens cell or shade 109 shaped like the frustum of a pyramid is positioned behind each of the lenses 108 to shield it from direct light from elongated light bulbs 110 employed to illuminate the rotatable chart 73. The lens frame 6 is laterally movable within its housing 111 so that all portions of the rotatable chart adjacent the reading line or thread 98 may be brought into view. This movement is necessary because the lenses 108 each magnify in each direction with the result that their combined fields of view include at any one time only half of the length of the reading line. This length is divided into four visible sections, one for each lens, separated by invisible portions of generally equal length. As the lens frame is moved the field of view of the lenses moves along the chart so that any portion of its length may be brought into view. The travel of the lens frame 6 must be at least equal to half the center to center distance of the lenses 108 and preferably should be substantially greater so that it is never necessary to take readings near the edge of the field of view of any one of the lenses 108. To facilitate the positioning of the lens frame 6 it is provided with a set of beveled tracks 112 which run on V-grooved rollers 113 journaled in the lens frame housing 111.

In addition to the indication afforded by the cooperation of the reading line 98, the indicator 96, and the chart 73 an indication of the weight in the load receiver 4 is provided by the cooperation of the indicator thread 96 and a chart 114 located behind a window 115 set in the front of the column 3 below the lens frame housing 111. The reading line of the chart 114 is parallel to the fixed index line provided by the thread 98.

The second weighing mechanism is of the "hook-pull" variety and is adjusted so that the point of intersection of the indicator thread 96 and the fixed index 98 moves through equal distances with equal increments of load corresponding to a uniformly graduated chart. As is well known the requirement of equal spacing of graduations along a straight reading line may be met if the indicator and the reading line are perpendicular to each other when the pivot line of the weighing lever is horizontal. In the weighing scale shown in the drawings the reading lines are horizontal so that the indicator is perpendicular to the pivot line of the weighing lever 81.

To provide good visibility of that portion of the indicator thread 96 which cooperates with the chart 114 a flat strip 116 attached to the indicator arm 91 and lying behind the indicator thread 96 is painted a contrasting color so that the thread stands out distinctly. Likewise an instruction bearing strip 117 in the lower part of the field of view of the lenses 108 aids in defining the visible portion of the rotatable chart 73 while keeping the instructions for reading the chart constantly before the operator.

The portion of the chart 73 and the part of the strip 117 within the field of view of the lenses 108 is illuminated by light from the elongated light bulbs 110. Because these bulbs need only be on during the time the scale is in use it is desirable that an automatic switch be included for controlling them. Figure IV shows a wiring circuit for the bulbs that provides either automatic or manual control. In this circuit electric current from a power line, not shown, is carried through a lead 118 and through either a manually operated switch 119 or through a lever actuated switch 120 and leads 121 to the light bulbs 110. The current after passing through filaments 122 of the light bulbs 110 flows through return leads 123 and 124 to the other side of the power line. The lever actuated switch 120 has a lower leaf 125 and a flexible upper leaf 126 rigidly attached to but insulated from the framework of the scale in a position such that the arm 79 of the transverse lever 65 carrying an insulator block 127 may raise the flexible leaf sufficiently to open the switch when there is no load on the first weighing mechanism. As soon as a small increment of load is applied the transverse lever 65 is drawn downwardly allowing the switch 120 to close and current to flow through the bulbs 110. If for any reason it is desired to illuminate the chart when there is no load on the scale the manually operated switch 119, connected in parallel with the automatic switch 120, may be closed.

In the preferred form of the invention the rotatable chart 73 is in the form of a cylinder and the indicia are printed on the chart before it is assembled into the cylindrical form. In its flat form, as shown in Figure XIII, all the indicia representing a given count or a given ratio of weights are disposed along a straight line extending from the intersection of the zero indicium geometrical element and a reference circle of revolution. The cooperation between a rotatable chart, a movable indicator, and a fixed reading line for indicating the ratio of two weights does not depend upon the rotatable chart being in the form of a cylinder but a rotatable chart in the form of a disk, a cone, or a frustum of a cone may also be employed in the practice of the invention. Each of these shapes of rotatable charts is a surface of revolution whose generating element is a straight line. Thus a cylindrical chart is formed when the generating element is a straight line lying parallel to the axis of revolution and each point along the length of the generating element traces out a circle of revolution which in the developed form as shown in Figure XIII, is a straight line parallel to the long dimension of the chart in the figure.

If the generating element is a straight line perpendicular to the axis of revolution the rotatable chart is a disk whose geometrical elements are radial lines and the circles of revolution are circles concentric with the axis of revolution but all lying in the same plane.

If the generating element is at an angle so that it or its extension intersects the axis of revolution the rotatable chart is a cone or a frustum of a cone in which the geometrical elements lie along the slant height of the cone and the planes of the circles of revolution divide the cone into right circular frustums.

Whether the chart be a cylinder, a cone or a frustum of a cone, it may be developed into a flat surface for locating and printing the indicia.

In the first example illustrating the invention a cylindrical chart is employed and the indicia are arranged according to the scheme illustrated in Figure XIII. A reference or zero geometrical element 128, which in the assembled and adjusted scale lies immediately behind the fixed index defined by the thread 98 when no load is on the scale, appears at the top of the figure and represents zero ratio. A reference circle of revolution 129 represented by a dashed line intersects the geometrical element 128 at the point 130. The reference circle 129 is beyond the right margin of the actual chart and is so located that its intersection with the element 128—the point 130—coincides with the intersection of the fixed index thread 98 and a produced extension of the movable indicator index line 96 when the index line 96 stands at zero on the chart 114.

Lines of indicia 131 representing various values of ratios of weight or counts extend across the surface of the chart and through the point 130. These, on a cylindrical chart, are straight lines because the reading point, the intersection of the indicator thread 96 and the fixed reading line thread 98 travels to the left along geometrical elements of the chart distances which are exactly proportional to the weight on the second weighing mechanism while the chart surface moves upwardly past the fixed reading line 98 a distance which is exactly proportional to the load on the main load receiver. When locating the lines on the chart, the chart may be assumed to stand stationary and the fixed index line to move downwardly a distance proportional to the weight on the main load receiver 1.

Since each of the lines 131 represents a certain value of ratio it follows that each line 131 is the trace of a point which moves so that its distance from the zero geometrical element 128 is N times its distance from the reference circle of revolution 129. The distance from the zero element to the point tracing one of the lines 131 must in the general case considering cones and disks as well as cylinders be measured in radians along the circle of revolution passing through the point. Its distance from the reference circle of revolution 129 is measured along a geometrical element of the chart.

If N takes the value zero, i. e. the weight on the main load receiver 1 is zero times the weight in the second or sample load receiver 4, there is no load on the load receiver 1 and the reading point—the intersection of the fixed index line 98 and the indicator thread 96—moves along the zero geometrical element 128. If N takes the value of infinity, i. e. a condition which may occur physically only when the load in the sample load receiver 4 is zero, the reading point remains on the reference circle of revolution 129 with its location along the circle determined by the load on the main load receiver 1. Intermediate values of N result when both the rotatable chart and the movable indicator move in response to loads so that the reading point overlies a point on one of the indicia lines 131. The particular line so determined by the two unknown loads or a known and an unknown load gives the ratio of the weights of the loads or, if the loads are composed of different numbers of similar pieces, the ratio of the number of pieces in one load to the number in the other load.

These values of N express the weight in the main load receiver in terms of the weight in the small load receiver. It may be desirable to reverse the indication and express the weight in the small load receiver in terms of the load on the main load receiver. This change can easily be made by substituting circles of revolution for geometrical elements and geometrical elements for circles of revolution. The reversed arrangement corresponds to a counting scale in which the rotatable chart rotates through an angle proportional to the weight of the sample while the movable indicator moves according to the main or unknown load. The general specification of the lines on the chart remains the same because in either case each line intersects each geometrical element at a point whose distance along the element from a reference circle of revolution is equal to a constant times its distance in radians from the zero indicating element. The constant may be directly or inversely proportional to the value of the indicia along the line.

If the lines of indicia in the first arrangement are arranged to indicate equal increments of ratio of weights then the lines of indicia 131 divide each of the circles of revolution into equal increments. The same series of lines of indicia divide the geometrical elements of the chart in distances measured from the reference circle of revolution which are inversely proportional to the values of the ratios represented by the lines. Thus in Figure XIII the line of indicia representing a ratio of 800, as shown in the lower right hand corner of the figure, intersects the last geometrical element 132 at a certain distance from the reference circle 129 as measured along the element 132. The indicia lines 131 representing the values of ratio of 400 and 200 also intersect the last element 132. The point of intersection of the 400 indicia line is just twice as far from the reference circle 129 as is the intersection of the 800 indicia line. Likewise the 200 indicia line intersects the last element 132 at a distance twice as great as the 400 indicia line. The same inverse relationship holds for any geometrical element of the chart which may be arbitrarily selected.

These definitions for the location of the indicia lines on the chart merely point out that the indicated ratio varies directly as the weight on the main load receiver 1 and varies as the reciprocal of the weight on the second or sample load receiver 4. Thus, if the load in the sample load receiver is maintained constant, equal increments of load on the main load receiver will show equal increments of ratio or count. This result follows because the reading point defined by the intersection of the movable indicator and the fixed reading line remains on the same circle of revolution of the rotatable chart which is divided by the indicia lines into equal intervals. However, if the load in the main load receiver is maintained constant and the load in the sample load receiver is doubled, the reading point moves along the fixed index line and the adjacent geometrical element of the rotatable chart in the direction of lower ratio or count until its distance from the reference circle of revolution is twice its original distance. Doubling the load and resulting indicator travel halves the indicated ratio, therefore the reciprocal term in the definitions of the intersections of the indicia lines and the elements.

An enlarged fragment of the completed chart is shown in Figure XIV. This fragment is taken to include a portion of the chart which cooperates with the fixed reading line 98 to indicate the actual weight of the load on the load receiver 1. This is the right hand portion carrying the graduations in pounds and tenths of pounds. Next to this a portion of the chart bearing indicia representing ratios of weight is shown. Three sets of indicia values are shown along each line. These sets of values are related by multiples of five so that the direct reading capacity as a counting scale may be increased by increasing the number of parts placed in the sample load receiver 4. The indicia shown are those employed in a weighing scale having a weighing capacity on the main load receiver 1 of forty-five pounds and a weighing capacity on the second load receiver of $45/100$ of a pound. The ratio of weights when each scale is loaded to capacity is therefore 100:1. When used as a counting scale two pieces are placed in the sample load receiver 4 for the low range of counts and the actual count for a load ratio of 100:1 is therefore 200. The counts from 300 to 420 shown in Figure XIV are based on using two pieces in the sample load receiver. The next lower set of indicia on the same lines having values from 1500 to 2100 are based on using ten pieces in the sample load receiver while the remaining indicia having values from 7500 to 10,500 are based on a sample of fifty pieces. These separate sets of indicia are preferably printed in contrasting colors so as to be readily distinguishable. Thus in Figure XII which illustrates a portion of the chart, as it is seen through one of the magnifying lenses 108, four rows of indicia are visible of which the top and bottom rows are from one series and color while the intermediate rows are from the other two series and colors. The strip 117 carries the directions calling for a particular color as determined by the number of pieces placed in the sample load receiver. In the example illustrated, red, blue, and green figures are employed corresponding to the use of two, ten, or fifty pieces in the load receiver.

The chart 114 provides a simple direct indication of the number of pieces to use in the sample load receiver. The upper portion of the chart 114 is divided into three zones of which the first zone represents the first four per cent of the weighing capacity of the scale, while the second zone includes from four per cent to twenty per cent of the capacity and the remaining zone includes the remaining eighty per cent. With two pieces placed in the sample load receiver the indicator line 96 will come to rest in one of the zones. Since only the third zone is employed when the scale is used for counting and determining ratios in weight the load in the sample load receiver must be sufficient to bring the indicator into this zone. Ordinarily two pieces are sufficient. If the weight of the two pieces is insufficient, a greater number of pieces must be employed the exact number being indicated by the zone in which the indicator came to rest. If the original two pieces move the indicator into the second zone, the weight of the two pieces is between four and twenty per cent of the capacity of the scale. By increasing the size of the sample five times, i. e. using ten pieces, the weight of the sample will be between twenty and one hundred per cent or in the third zone as required. If the weight of the original two pieces is less than four per cent of the capacity of the scale the sample must be increased at least twenty-five times in order to move the indicator into the third zone. In this manner three counting ranges are provided differing from each other in the ratio of 5:1 and each range is direct reading. The design of the scale requires that the operator use a sufficiently large sample so that the full accuracy of the scale is realized but also prevents him from overloading the scale because each weighing mechanism operates independently of the other and only the weight indications are combined to determine the count.

The example of the improved counting scale described has a weighing capacity somewhat greater than is required in many installations. The design of the weighing mechanisms, however, is such that the capacity of both weighing mechanisms may be reduced to a small fraction of that described without seriously affecting the accuracy of indication. Likewise the number of ranges provided may be varied as desired or as required for a particular application.

It was previously mentioned that the rotatable chart need not necessarily be in the form of a cylinder. It may also be in the form of a cone or a disk. A disk form of chart illustrated in Figure XV, comprises a rotatable disk 133 adapted to be rotated by a first weighing mechanism and having indicia 134 and ratio or counting indicia 135 printed or otherwise marked on its surface. A movable indicator 136 having a stretched thread 137 serving as its index portion lies in a plane slightly in front of the plane of the disk 133. The movable indicator 136 is actuated by a second load weighing mechanism and moves toward the center of the disk 133 with an increase of load on the second weighing mechanism. A fixed reading line 138 lying parallel to and closely adjacent a radial geometrical element of the disk 133 extends along the greater portion of the travel of the indicator 136. A portion of the rotatable chart 133, the indicator index 137, and the fixed reading line 138 are visible through a window 139 cut through the front portion of an enclosing housing 140.

The counting indicia lines 135 are located in the same manner and according to the same formula as used in locating the indicia on the cylindrical chart. As before, each line of indicia is traced by a point which moves so that its distance from a zero or reference geometrical element 141 measured in radians along a circle of revolution is N times the distance from a reference circle of revolution 142 as measured along a geometrical element of the chart. As in the preceding example, the reference circle of revolution is the circle determined by the intersection of the fixed reading line and the movable indicator when there is no load on the second weighing mechanism. In this example the lines representing counting indicia of equal value are curved because the distances measured along the circles of revolution are measured in radians and the circles are of various radii while the distances measured along the geometrical elements are in fixed units of length. The zero or reference geometrical element 141 however is a straight line. As in the preceding example the counting indicia lines 135 intersect the various circles of revolution at equal increments of distance and intersect the various elements at distances from the reference circle that vary as the reciprocal of the distances from the reference element at which the lines intersect another circle of revolution.

The disk form of rotatable chart also indicates the procedure to be followed in constructing a conical rotatable chart. The surface of a cone may be formed from a disk having a sector removed. The indicia lines may be located and printed on a portion of a disk which is later rolled into the conical form and mounted in the scale. The reading line and the path of the movable indicator must, of course, be parallel to a geometrical element of the chart and therefore cannot be parallel to the axis of the rotatable chart except when the cylindrical form of chart is used.

Various modifications may be made in the construction of a ratio indicating scale as may be required in various applications without departing from the invention disclosed.

Having described the invention, we claim:

1. In a weighing scale, in combination, a first weighing mechanism, an indicating chart that is operatively connected to the mechanism to rotate through equal angles in accordance with equal increments of load and that is in the general form of a surface of revolution whose generating element is a straight line intersecting the axis of rotation, said chart having lines each of which intersects each geometrical element of the chart at a point whose distance along the element from a reference circle of revolution is equal to a constant times its distance in radians from a reference geometrical element, a fixed reading line parallel and closely adjacent to the zero load position of the reference element of the chart, a second weighing mechanism, and an indicator operatively connected to the second mechanism and movable along the fixed reading line through equal distances in accordance with equal increments of load.

2. In a weighing scale, in combination, a first weighing mechanism, an indicating chart that is operatively connected to the mechanism to rotate through equal angles in accordance with equal increments of load and that is in the general form of a surface of revolution whose generating element is a straight line intersecting the axis of rotation, said chart having lines each of which intersects each geometric element at a point whose distance along the element from a reference circle of revolution is equal to a constant times its distance in radians from a reference geometrical element, a fixed reading line parallel and closely adjacent to the zero load position of the reference element of the chart, means for presenting an enlarged image of the reading line and the adjacent portion of the chart, a second weighing mechanism, and an indicator driven by the second mechanism and movable along the fixed reading line through equal distances in accordance with equal increments of load.

3. In a weighing scale for indicating the ratio of the weights of two loads, in combination, a first weighing mechanism for weighing one of the loads, a second weighing mechanism for weighing the other of the loads, a chart that is rotated by the first weighing mechanism through equal angles in accordance with equal increments of load and is in the general form of a surface of revolution whose generating element is a straight line intersecting the axis of rotation, an indicator that is driven by the second weighing mechanism along a path parallel and adjacent to the zero load position of a reference geometrical element of the chart through equal distances in accordance with equal increments of load, said chart having lines representing successive magnitudes of the ratio of the weights of the loads each of which intersects each geometrical element at a point whose distance along the element from a reference circle of revolution is equal to a constant times its distance in radians from the reference element.

4. In a weighing scale, in combination, a first weighing mechanism, an indicating chart that is driven by said mechanism through equal angles in accordance with equal increments of load and is in the form of a surface of revolution whose generating element is a straight line perpendicular to the axis of revolution, said chart having lines each of which intersects each geometrical element of the chart at a point whose distance along the element from a reference circle of revolution is equal to a constant times its distance in radians from a zero indicia line, a second weighing mechanism, and an indicator driven by the second mechanism along the zero load position of said indicia line through equal distances in accordance with equal increments of load.

5. In a weighing scale for indicating the ratio of two loads, in combination, a first weighing mechanism, a chart that is rotated by the first weighing mechanism and that has ratio indicating indicia on its surface, a second weighing mechanism, an indicator that is actuated by the second weighing mechanism and that moves along a path a portion of which is adjacent the zero load position of the zero indicium of the chart, and a second chart parallelly adjacent the path of the indicator, said second chart being divided into zones one of which is coextensive in indicating capacity with the path of the indicator adjacent the rotatable chart, the remaining zones each indicating a range of weights that is a constant times the indicating range of the adjacent zone.

6. In a weighing scale for indicating the ratio of two loads, in combination, a first weighing mechanism, a chart that is rotated by the first weighing mechanism and that has a plurality of sets of ratio indicating indicia on its surface, a second weighing mechanism, an indicator that is actuated by the second weighing mechanism and that moves along a path a portion of which is adjacent a geometrical element of the chart, the indicator cooperating with the indicia to indicate ratios of load, and a second chart along the path of the indicator, the second chart being divided into zones one of which is coextensive in indicating capacity with the portion of the path of the indicator adjacent the rotatable chart, the remaining zones each indicating a range of weights that bears the same ratio to the range of the first zone as the value of one of the sets of indicia bears to another of the sets of indicia.

7. In a weighing scale for indicating the ratio of the weights of two loads, in combination, a first weighing mechanism, a chart that is rotatable by the first weighing mechanism, said chart having a plurality of sets of ratio indicating indicia on its surface with the value indicated by each set of indicia being a constant times the value indicated by another set, a second weighing mechanism, and an indicator that is positioned by the second mechanism and that moves along a path parallel to a geometrical element of the rotatable chart which path extends beyond the length of the rotatable chart to the zero load position of the indicator, the total length of said path being as many times greater than the extended portion of the path as the value of one set of indicia is greater than another set of indicia.

8. In a weighing scale for indicating the ratio of the weights of two loads, in combination, a first weighing mechanism for weighing one of the loads, a second weighing mechanism for weighing the other of the loads, a chart that is rotated by the first weighing mechanism through equal angles for equal increments of load and that is in the form of a surface of revolution whose generating element is a straight line intersecting the axis of rotation of the chart, a zero indicia line extending along a geometrical element of the chart, an index strand extending along and adjacent to the zero load position of the zero indicia line, and an indicator operatively connected to the second weighing mechanism and arranged to travel along said strand equal distances for equal increments of load, said chart having a plurality of ratio indicating indicia lines each of which is the locus of a point that moves over the surface of the chart while maintaining its linear distance from a reference circle on the chart registering with the zero position of the indicator in constant proportion to its angular displacement from the zero indicia line of the chart.

9. In a device for determining the number of duplicative articles in a group thereof of the type having a stationary index and a chart supported for movement relative to said index at right angles to the length thereof; index means movable longitudinally of said stationary index, said movable index having a line disposed at an angle to and crossing said stationary index and means actuated by the weight of a known number of said duplicative articles for moving said line to cause movement of the point where said line and stationary index cross longitudinally of the latter, said line being moved certain distances by predetermined units of weight.

CHARLES O. MARSHALL, JR.
MAYNARD C. YEASTING.

REFERENCES CITED

The following references are of record in the file of this patent:

UNITED STATES PATENTS

| Number | Name | Date |
|---|---|---|
| 1,459,886 | Hammond | June 26, 1923 |
| 1,729,788 | Mittendorf | Oct. 1, 1929 |
| 1,918,877 | Templeton | July 18, 1933 |
| 2,316,627 | Sang | Apr. 13, 1943 |
| 2,334,326 | Hem | Nov. 16, 1943 |
| 2,502,090 | Hallwood | Mar. 28, 1950 |

FOREIGN PATENTS

| Number | Country | Date |
|---|---|---|
| 406,309 | Great Britain | 1933 |